US009311280B2

(12) United States Patent
Devara et al.

(10) Patent No.: US 9,311,280 B2
(45) Date of Patent: Apr. 12, 2016

(54) RE-ORDERING OF IFRAME EXECUTION TO REDUCE NETWORK ACTIVITY WINDOW

(75) Inventors: Kavitha Vallari Devara, La Jolla, CA (US); Bojin Liu, Davis, CA (US); Rajiv Kumar Vijayakumar, La Jolla, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 404 days.

(21) Appl. No.: 13/595,097

(22) Filed: Aug. 27, 2012

(65) Prior Publication Data

US 2014/0059422 A1    Feb. 27, 2014

(51) Int. Cl.
   *G06F 15/16* (2006.01)
   *G06F 17/22* (2006.01)
   *G06F 9/50* (2006.01)

(52) U.S. Cl.
   CPC .......... *G06F 17/2247* (2013.01); *G06F 9/5044* (2013.01); *Y02B 60/142* (2013.01)

(58) Field of Classification Search
   CPC .......... G06F 17/27; G06F 17/21; G06F 17/30
   USPC .................... 715/234; 709/217, 205; 718/102
   See application file for complete search history.

(56) References Cited

U.S. PATENT DOCUMENTS

| 2005/0240940 | A1* | 10/2005 | Quinet et al. ............... 719/315 |
| 2010/0064109 | A1* | 3/2010 | Bull et al. ................. 711/151 |
| 2011/0029899 | A1* | 2/2011 | Fainberg et al. ............ 715/760 |
| 2012/0079057 | A1* | 3/2012 | Fainberg et al. ............ 709/214 |
| 2012/0110433 | A1* | 5/2012 | Pan et al. ................. 715/234 |
| 2013/0262978 | A1* | 10/2013 | Reshadi et al. ............. 715/234 |
| 2014/0068622 | A1* | 3/2014 | Gmuender et al. ........... 718/102 |

* cited by examiner

*Primary Examiner* — Douglas Blair
(74) *Attorney, Agent, or Firm* — Neugeboren O'Dowd PC

(57) ABSTRACT

Systems and methods are herein disclosed for reducing power consumption, processor activity, network activity, and for improving a user experience during web browsing. More particularly, an ordering of IFrames, or other self-contained component within the mainframe, is modified in terms of network resources, memory resources, and processor resources in order to conserve user device resources. For instance, aspects of multicore processors and multichannel network connections are utilized to perform parallel operations on mainframe data packets and IFrame data packets when a webpage is downloaded. Since mainframes and IFrames are sourced from different URLs they can be received on separate communication channels and can be processed on different cores. Prioritization in memory storage between the two can also be used to enhance the speed with which the mainframe is loaded.

23 Claims, 6 Drawing Sheets

RE-ORDERING OF IFRAME EXECUTION TO REDUCE NETWORK ACTIVITY WINDOW

BACKGROUND

1. Field

The present disclosed embodiments relate generally to web browser functionality, and more specifically to reordering of operations during browser pageload.

2. Background

With regard to web browser functionality, a "mainframe" is a document rendered by a web browser (e.g., and HTML document) that typically spans a web browser's window and can include one or more self-contained components such as IFrames. Most web-based advertisements are rendered within an IFrame, or some other independent object within a mainframe of a webpage. An IFrame is an HTML addition to the Frames toolbox that creates a frame within another webpage or mainframe, where the IFrame is filled with a second webpage. The mainframe and the IFrame each have their own URLs, thus enabling the mainframe and IFrame to have distinct and independent content and functionality. This ability allows the same webpage to be displayed at different times, to different users, and on different devices, and also includes ads tailored to the time, user, or device. Since an IFrame is a feature of HTML utilized in a variety of web browsers including, for example, Safari, Firefox, Internet Explorer, and Google's CHROME, to name a few, IFrames are often used to embed advertisements within webpages.

Typically the mainframe and IFrame download via a single communication channel and are processed on a single core (see top timing chart in FIG. 3). Gaps in the network activity often arise when the application processor must dedicate its resources to parsing and executing data packets before it can resume fetching further data packets. Similarly, gaps in the network activity can arise when the application processor must parse and execute data packets before it can determine which further data packets to fetch. The communication channel is therefore underutilized and remains active even when not in use. A pageload also takes longer because scheduling network activities and processing cannot occur in parallel. Mainframe and IFrame data packets also typically compete for preferred memory slots (e.g., cache vs RAM or virtual memory). There is therefore a need in the art for systems and methods to enable more efficient utilization of network, core, and memory resources.

SUMMARY

Embodiments disclosed herein address the above stated needs modifying the order in which IFrames, or other self-contained component within the mainframe, are transmitted via network resources, stored in memory resources, and processed in processor resources. The reordering conserves user device power and makes better use of network, processor, and memory resources. For instance, aspects of multicore processors and multichannel network connections are utilized to perform parallel operations on mainframe data packets and IFrame data packets when a webpage is downloaded. Since mainframes and IFrames are sourced from different URLs they can be received on separate communication channels and can be processed on different cores. Prioritization in memory storage between the two can also be used to enhance the speed with which the mainframe is loaded.

Some aspects of the disclosure can be characterized as a method of loading a webpage, the webpage having a mainframe and at least one self-contained component within the mainframe, the method comprising. The method can include receiving data packets in response to a request to load a webpage having the mainframe. The method can further include determining that the webpage includes the at least one self-contained component within the mainframe. Also, the method may include identifying those of the data packets that are mainframe data packets. Additionally, the method can include identifying those of the data packets that are data packets corresponding to the at least one self-contained component within the mainframe. The method may further include processing the mainframe data packets on a first core of an application processor. The method may yet further include processing data packets corresponding to the at least one self-contained component within the mainframe on a second core of the application processor. The method may also include rendering the mainframe from the mainframe data packets. The method may further include rendering the at least one self-contained component within the mainframe from the data packets corresponding to the at least one self-contained component within the mainframe.

Some aspects of the disclosure can also be characterized as a system comprising a network interface, an application processor, a memory, and a memory controller. The network interface can receive, in response to a request for a webpage, mainframe data packets for a webpage and data packets corresponding to one or more self-contained components of the webpage. The application processor can have a first core and a second core. The first core can process the mainframe data packets, and the second core can process the data packets corresponding to the one or more self-contained components of the webpage. The memory can have at least first and second levels of memory. The memory controller can oversee storage of the mainframe data packets and the data packets corresponding to the one or more self-contained components of the webpage in either or both of the first and second levels of the memory.

Other aspects of the disclosure can be characterized as a non-transitory, tangible computer readable storage medium, encoded with processor readable instructions to perform a method for downloading a webpage. The method can include receiving first data packets in response to a first request for a webpage. The method can also include parsing the first data packets to identify any self-contained components of the webpage. If one or more self-contained components are identified, then the method can store an indicator that the webpage includes one or more self-contained components. In this event the method can further process a second portion of the first data packets corresponding to the one or more self-contained components of the webpage on a second processor of the user device. Otherwise, the method can process the first data packets of the mainframe of the webpage on the first processor of the user device.

Further aspects of the disclosure can include a system. The system can include a means for receiving mainframe data packets interspersed with data packets of a self-contained component of the mainframe. The system can further include a means for processing the mainframe data packets. The system can also include means for storing the data packets of the self-contained component of the mainframe until the mainframe data packets are processed. The system can also include a means for processing the data packets of the self-contained component of the mainframe after the mainframe data packets have processed.

DETAILED DESCRIPTION

Figure 1:
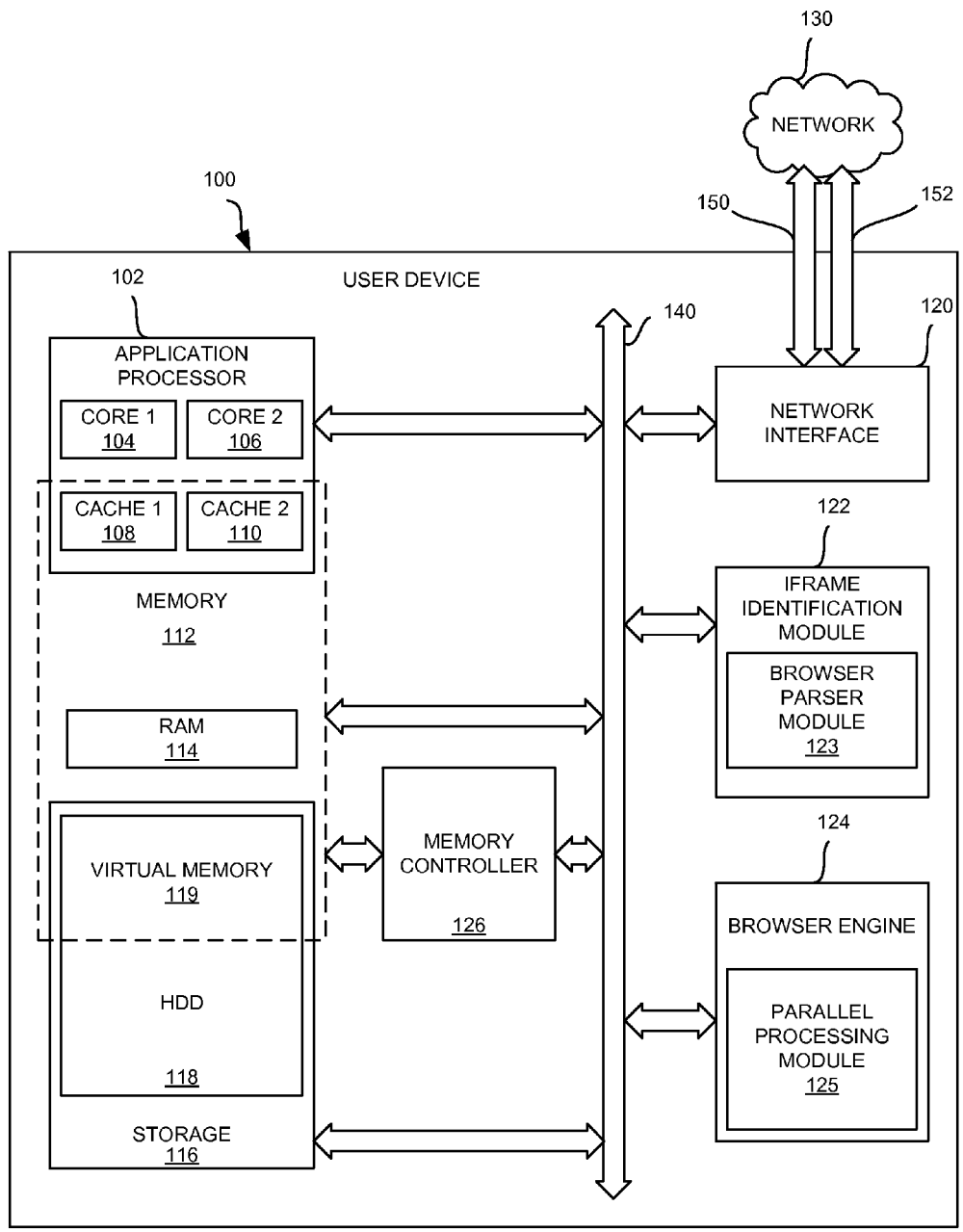
FIG. 1 illustrates one embodiment of a system diagram for a user device.

The word "exemplary" is used herein to mean "serving as an example, instance, or illustration." Any embodiment described herein as "exemplary" is not necessarily to be construed as preferred or advantageous over other embodiments.

To meet the needs described in the background, the present disclosure describes systems and methods for more efficient utilization of network resources, processor resources, and memory resources. In particular, an IFrame within a webpage (or mainframe) can be identified and processed separately from, and in parallel to, the mainframe such that the IFrame and the mainframe do not compete for network resources, processor power, or network bandwidth. Said another way, by sending mainframe and IFrame data packets to separate cores of an application processor, an IFrame data packet can be fetched while a mainframe data packet is being processed and vice versa, thus enabling earlier fetching of data packets. As a result, users experience faster pageloads, the modem can enter an idle state more quickly and more often, and processor resources are less taxed. This not only improves system performance, but also reduces power consumption. As used herein, processing includes parsing and executing a data packet.

Identification of an IFrame can involve parsing the HTML code of a webpage, and identifying an IFrame tag within the code. Once identified, the IFrame can be processed in parallel to the mainframe. In one aspect, packets corresponding to the mainframe can be processed on a first core of an application processor, and packets corresponding to the IFrame can be processed on a second core of the application processor (see FIGS. 4 and 5). In another aspect, packets corresponding to the IFrame can be downloaded and directed to a second core of the application processor during moments when packets corresponding to the mainframe are being processed by a first core of the application processor (see FIG. 4). Also, packets corresponding to the mainframe can be downloaded via a first communication channel, while packets corresponding to the IFrame can be downloaded via a second communication channel (see FIG. 5).

In situations where limited bandwidth and a single core configuration prevent either of the above parallel uses of the network to be implemented, data packets corresponding to the mainframe can be processed before any packets corresponding to the IFrame are processed. Traditionally, the data packets are interspersed and thus are processed on the single core in an interspersed order. Even though it may only take 2 ms to process mainframe data packets, since they are processed in the same interlaced order that they are received, along with the IFrame data packets, the mainframe takes longer than 2 ms to process. Since the mainframe is the more important component of a webpage rendering, data packets corresponding to the IFrame can be held in memory (e.g., a cache) until all data packets corresponding to the mainframe are processed, thus decreasing the time required to process and render the mainframe.

In another aspect of the disclosure, memory allocation can be prioritized such that packets corresponding to the mainframe can be stored in the same or faster types of memory than packets corresponding to the IFrame.

FIG. 1 illustrates one embodiment of a system diagram for a user device 100. The user device 100 includes a network interface 120, an application processor 102, memory 112, storage 116, an IFrame identification module 122 with a browser parser module 123, a browser engine 124 having a parallel processing module 125, and a memory controller 126. These various components are in communication with each other via a bus 140 (and the memory controller 126 has direct communication with the memory 112 in addition to communication via the bus 140). The network interface 120 transmits and receives data packets from the network 130 via a first channel 150 and/or a second channel 152, and controls allocation of the first and second channels 150, 152.

Received data packets are passed via the bus 140 to the application processor 102. The application processor 102 includes at least a first core 104 and second core 106, along with at least a first cache 108 and a second cache 110. A parallel processing module 125 can control how the first and second cores 104, 106 are allocated to processing (e.g., parsing and executing) the received data packets. Data packets can be stored in a memory 112 and can be allocated to different levels of the memory 112 as dictated by a memory controller 126. Different levels of memory 112 can include the first and second cache 108, 110, random access memory (RAM) 114, and a portion of a hard drive (HDD) 118 allocated to the memory 112 as virtual memory 119. Data packets can also be stored in the HDD 118 of the storage 116 without being part of the virtual memory 119.

The network interface 120 can control which data packets are received via the first channel 150 and which are received via the second channel 152. For instance, data packets corresponding to the mainframe can be allocated to the first channel 150 while data packets corresponding to the IFrame can be allocated to the second channel 152, or vice versa. The first and second channels 150, 152 can be implemented as different communication paths or protocols. For instance, one can be a Wi-Fi channel while the other is a cellular channel. In another example, one can be a wired channel while the other is a wireless channel. In yet another instance, one can use the 802.1n wireless protocol while the other uses 802.1g. Other types that the first and second channels 150, 152 can take include, but are not limited to, 3G and 4G data, WiMAX, and ZIGBEE. The network 130 can include the public Internet, a private intranet, a cellular network, a satellite network, or a combination of these or these and other network types, to name a few.

The network interface 120 can also control an order in which data packets are received via the channels 150, 152. This is especially true in bandwidth-limited instances, or those where only a single channel is available. In such instances, the network interface 120 aligns the data packets such that all the data packets corresponding to the mainframe are downloaded before the first data packet corresponding to the IFrame downloads.

The IFrame identification module 122 can distinguish between data packets that correspond to the mainframe and data packets that correspond to the IFrame, for instance by identifying webpages having IFrames. In one embodiment, such webpages can be identified by an IFrame tag in the webpage's code (e.g., <IFrame . . . > in the HTML code). In some embodiments, a browser parser module 123 can aid in this identification by parsing the incoming data packets and identifying IFrame tags in the parsed data packets. Although only a single browser parser module 123 is shown, there may be a browser parser module 123 running on each of the first and second cores 104, 106 and therefore there can be two or more browser parser modules 123.

The browser engine 124 can be configured to control certain aspects of webpage download and processing. In particular, the parallel processing module 125 can be configured to control how the first and second cores 104, 106 process the data packets. For instance, the parallel processing module 125 can direct the first core 104 to parse and execute mainframe data packets in parallel to the second core 106 parsing and executing IFrame data packets.

The memory controller 126 can dictate where and when data packets are written to the memory 112. The importance of this control is that the memory 112 includes different levels of memory where each level has different read and write speeds. For purposes of this disclosure, the first cache 108 is at the highest level of the memory 112 and the RAM 114 is typically at the bottom of the memory 112, with the second cache 110 in the middle. However, in some cases, the first and second caches 108, 110, and the RAM 114 may be filled such that further memory 112 is required. In such instances, a portion of the HDD 118 can be allocated to the memory 112 as virtual memory 119. In such instance, the virtual memory 119 is at the lowest level of the memory 112. Typically, the first cache 108 has faster read and write times than the second cache 110, the second cache has faster read and write times than the RAM 114, and the RAM 114 has faster read and write times than the virtual memory (or HDD 118), although these relations may not always hold true.

The IFrame identification module 122 and the parallel processing module 125 can be implemented as software, firmware, hardware, of a combination of the above. For instance, both modules 122, 125 may be software operating on the application processor 102. In an alternative example, the modules 122, 125 may be firmware operating on an ASIC.

While the illustrated application processor 102 has a first and second core 104, 106, in other embodiments the application processor 102 can have more than two cores. Additionally, while the application processor 102 is illustrated as having only a first and second cache 108, 110, in other embodiments the application processor 102 can include more than two caches. While the first and second cache 108, 110 are illustrated as being separate from the first and second core 104, 106, in other embodiments, one or more caches can be part of one or more of the cores. In some embodiments, the application processor 102 can be a single integrated circuit having multiple cores and multiple caches.

The user device 100 may be implemented as any of a variety of communication devices (e.g., cell phones, smart phones, tablet computers, to name a few) or computing devices (e.g., laptop computers, desktop computers, ultra books, to name a few). In the illustrated embodiment the user device 100 includes a single HDD 118. However, in other embodiments two or more HDD's 118 can be implemented. The network interface 120 is illustrated as communicating with the network 130 via a first channel 150 and a second channel 152, but in other embodiments three or more channels may be utilized.

In some embodiments, the IFrame identification module 122 and/or the browser engine 124 can run on the application processor 102. A variety of other components of the user device 100 may also be implemented, but are not illustrated for the sake of clarity and simplicity of FIG. 1. For instance, a baseband processor, a user input interface, and peripherals interfaces, are just a few components that would likely be found in the user device 100, but are not illustrated.

Figure 2:
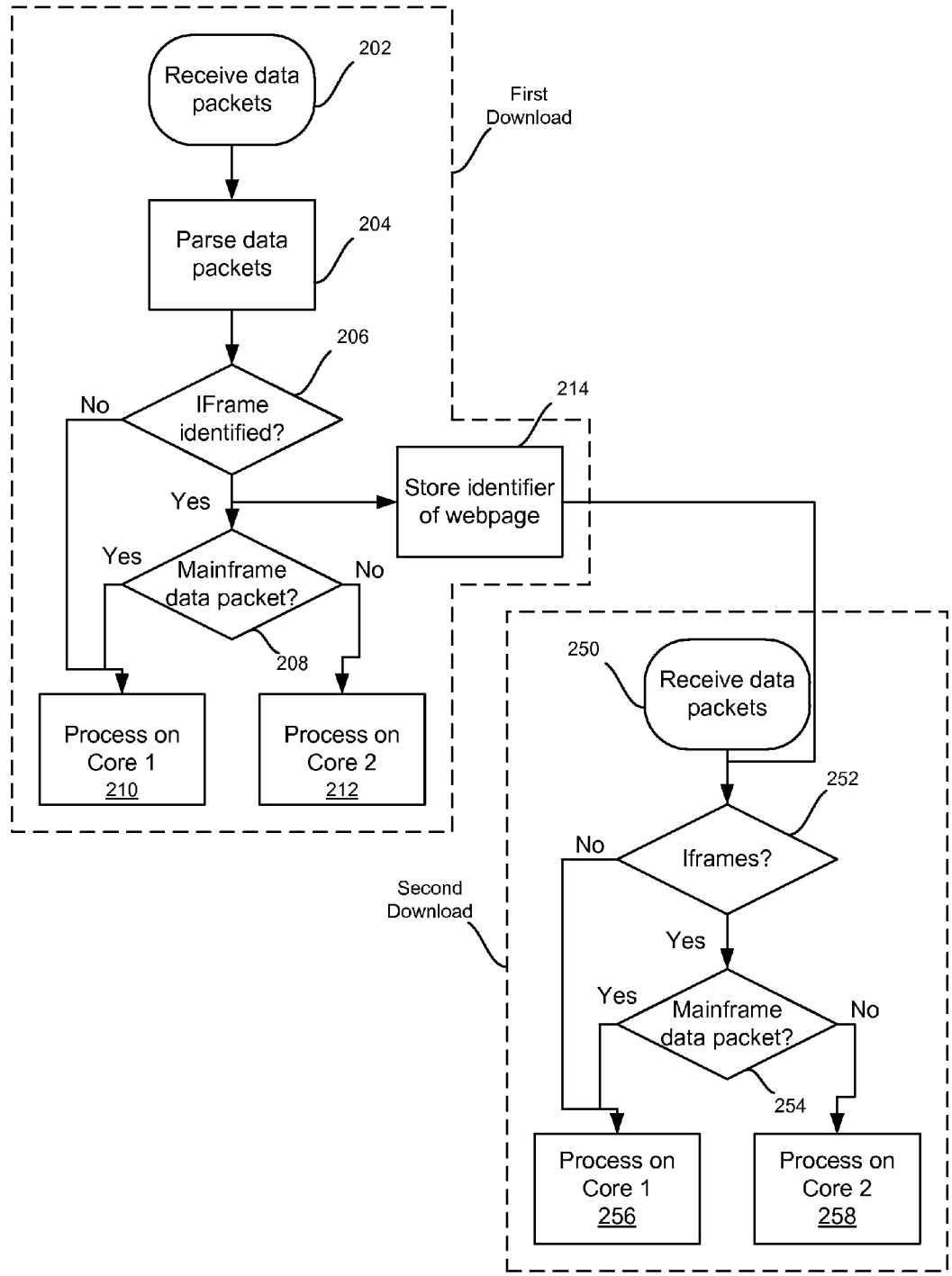
FIG. 2 illustrates a method of downloading and processing webpage data packets in response to a request for a webpage.

The following discussions detail systems and method for (1) identifying IFrames, (2) allocating processor resources, (3) allocating network resources, and (4) allocating memory resources. This discussion will also describe aspects of FIG. 1 in conjunction with descriptions of method steps as illustrated in FIG. 2.

Identifying Iframes

The first time that a webpage is downloaded to the user device 100, data packets are received (Block 202 or 302 of the first download in FIG. 2 or 3) through the network interface 120 and the IFrame identification module 122 parses the incoming data packets (Block 204 or 304) to determine whether the webpage includes one or more IFrames (Block 206 or 306). If an IFrame is not detected, then the parallel processing module 125 instructs the first core 104 to process the data packets (Block 210). Alternatively, or at the same time, the memory controller 126 can instruct data packets corresponding to the webpage to be stored in a fastest memory (Block 310).

If an IFrame is detected, then the parallel processing module 125 determines which data packets correspond to the mainframe (Block 208) and which correspond to the IFrame. The parallel processing module 125 then instructs the first core 104 to process data packets corresponding to a mainframe of the webpage (Block 210) and instructs the second core 106 to process data packets corresponding to the IFrame (Block 212). Alternatively, or at the same time, the memory controller 126 can store data packets corresponding to the mainframe in a fastest memory (Block 310) and can store data packets corresponding to the one or more IFrames in a remaining memory (Block 312). Assuming that an IFrame is detected, an identifier of the webpage can be stored in the memory 112 (Block 214 or 314) so that subsequent downloads of the webpage can avoid the parsing the data packets (Block 204 or 304).

In particular, when a second download of the webpage begins (Blocks 250 and 350), the IFrame identification module 122 can scan the memory 112 to see if there is an identifier of the webpage in the memory 112 or on the HDD 118 (Block 252 or 352), thus indicating that the webpage has one or more IFrames. If the check (Block 252 or 352) indicates that the webpage has IFrames, then the parallel processing module 125 can instruct the first and second cores 104, 106 to process the data packets corresponding to the mainframe and the one or more IFrames in parallel (Blocks 254, 256, 258). Alternatively, or at the same time, the memory controller 126 can store data packets corresponding to the mainframe in a fastest memory (Block 356) and data packets corresponding to the one or more IFrames in remaining memory (Block 358). In this fashion, the second download of the webpage can be performed faster than the first download since there is no need to parse the data packets (Block 204 or 304) to determine if one or more IFrames are present.

Processor Resources

Traditional methods for processing data packets for both mainframes and IFrames do not distinguish between the two, and therefore process both mainframes and IFrames on the same core even where multiple cores are available for processing. Many of today's application processors have two or more cores, and this disclosure takes advantage of such multicore processors by processing data packets associated with the mainframe on a first core while processing data packets associated with one or more IFrames on a second core (or third, fourth, fifth, etc).

The user device 100 can receive first data packets corresponding to a mainframe and second data packets corresponding to an IFrame (Block 202). Traditionally, both sets of data packets were processed on a single core. However, here, by identifying which data packets correspond to the mainframe and which correspond to the IFrame, (Blocks 208, 254) the first data packets can be sent to and processed on the first core 104 (Blocks 210, 256) while the second data packets can be sent to and processed on the second core 106 (Blocks 212, 258). As a result, total processing time for the webpage is decreased, which reduces the pageload time and reduces the amount of time that a modem processor remains in an active state. This results in reduced power consumption and improved user experience. This also frees up the application processor 102 resources faster so that other user device 100 functions can utilize the application processor 102.

Processor resources and pageload time can further be reduced during the second download and subsequent downloads since parsing of the data packets (Block 204) and the IFrame identification decisions (Block 206) can be avoided as discussed in the IDENTIFYING IFRAMES section above. Instead, the second and subsequent downloads can look to the identifier of a webpage stored in the memory 112 identifying a webpage as having one or more IFrames (Block 214).

Network Resources

Figure 5:
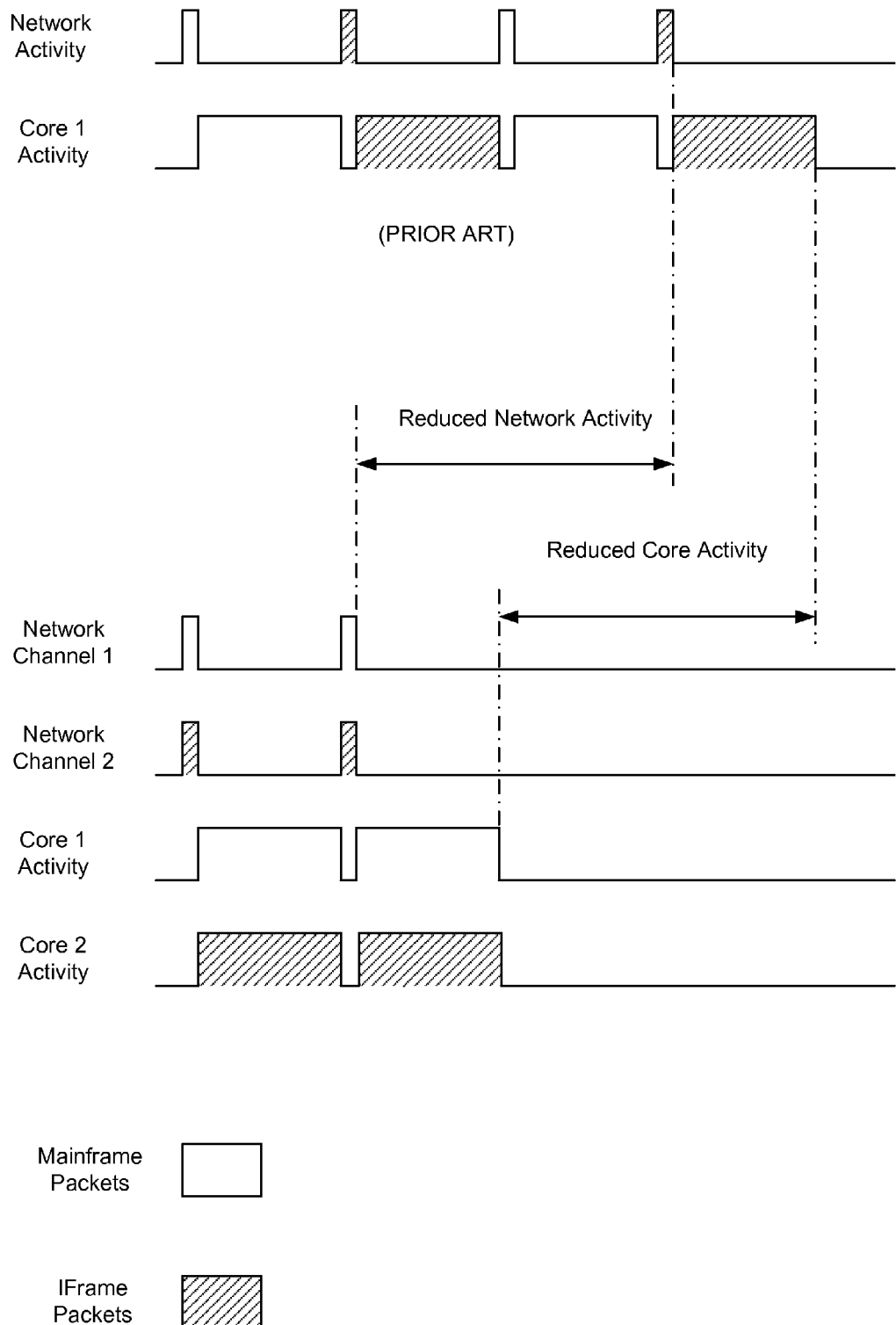
FIG. 5 illustrates a timing diagram as known in the art compared to a timing diagram for the systems and methods herein disclosed.

Traditional methods for downloading packets utilize a single network channel and do not distinguish between mainframe and IFrame data packets (see FIG. 5—PRIOR ART). As a result, the mainframe and IFrame data packets compete for network resources rather than utilizing them in a planned and organized fashion. Furthermore, since traditional methods process mainframes and IFrames on the same core, there is nothing to gain from using multiple communication channels.

This disclosure introduces the concept of parallel processing mainframe data packets and IFrame data packets on the first and second cores 104, 106 (see FIGS. 4 and 5), which in turn also enables receiving data packets on two or more channels (see FIG. 5). In particular, the network interface 120 can dictate that data packets corresponding to the mainframe can be received on the first channel 150 and data packets corresponding to the IFrame can be received on the second channel 152.

Figure 4:
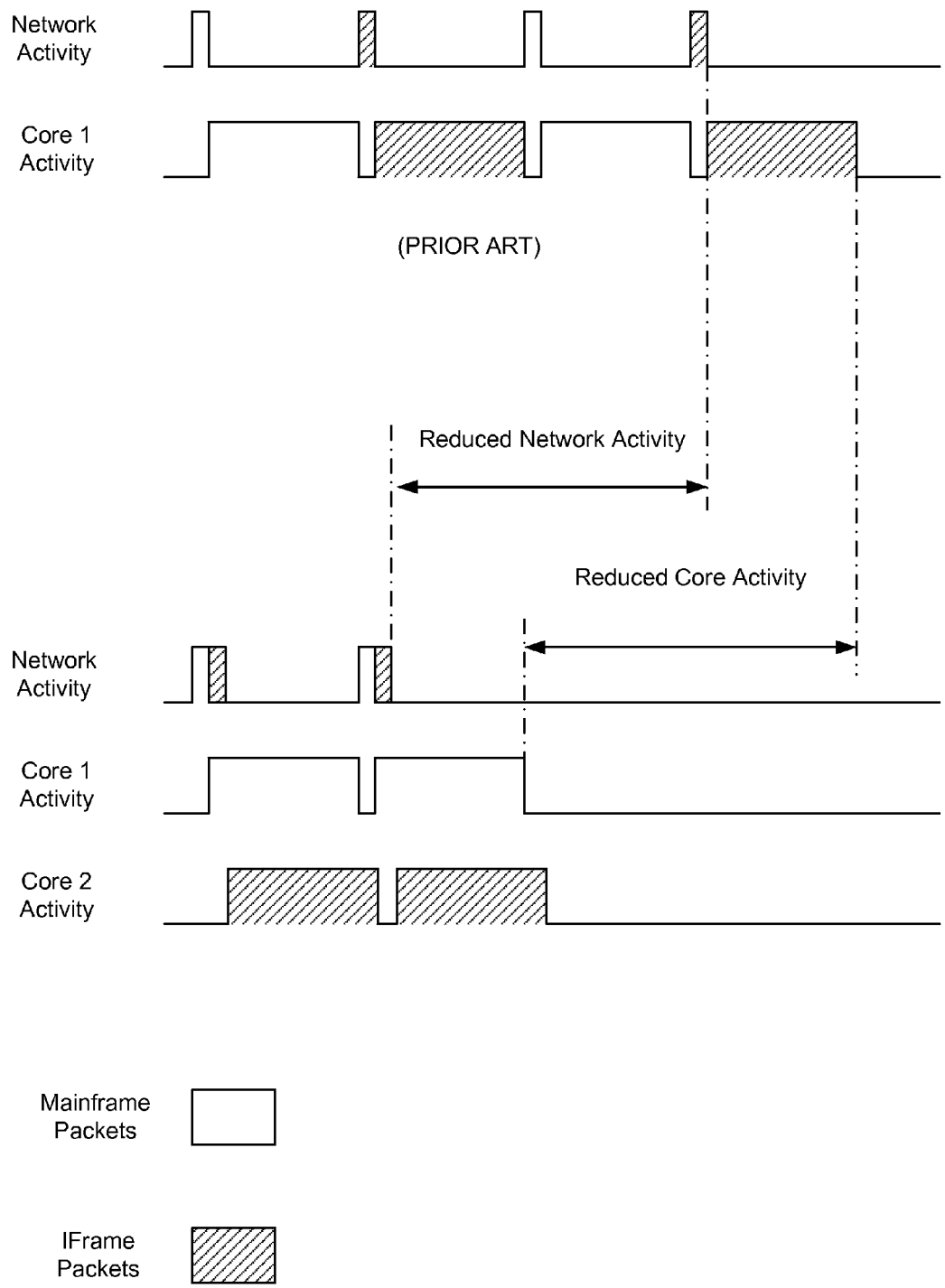
FIG. 4 illustrates a timing diagram as known in the art compared to a timing diagram for the systems and methods herein disclosed.

For instance, in FIG. 5 mainframe data packets are received on a first channel while IFrame data packets are received on a second channel. As compared to the PRIOR ART where a single channel is used, the parallel or dual channel method enables four data packets to arrive in half the time required for the four data packets to arrive in a traditional single-channel setup. What is more, in the parallel channel setup, since data packets corresponding to both the mainframe and IFrames arrive at the same time, they can be processed in parallel on a first and second core, which reduces the total pageload time (and total core activity time) as compared to a single channel and single core methodology.

Where only a single channel and a single core are available, such as in FIG. 4—PRIOR ART, data packets cannot be downloaded and processed simultaneously since each data packet has to be processed before an application processor can know which data packets to download next. As such, gaps form in the network usage where the network is active, but no data is being downloaded. By providing mainframe data packets to a first core and IFrame data packets to a second core, data packets can be fetched more often and can be more closely spaced on the single channel, thus reducing the use of network resources, decreasing pageload times, and decreasing the time in which either of the two cores are actively processing the four illustrated data packets. This requires interlacing of the fetching and download of the mainframe and IFrame data packets—in other words, a mainframe data packet can be downloaded, sent to a first core for processing, and while being processed an IFrame data packet can be downloaded, and then sent to a second core for processing (see FIG. 4). This also enables the modem to be idled sooner than in the prior art since there is reduced network activity as compared to the art. Put another way, data packets corresponding to the mainframe are processed on the first core 104 as is usually done, but data packets corresponding to the IFrame are downloaded during moments when the channel is not in use for downloading mainframe data packets, and then these IFrame data packets are processed on the second core 106.

Additionally, delays arise in bandwidth-limited situations where there is only a single channel, since the mainframe and IFrame data packets compete for space on the lone channel. Since mainframe and IFrame data packets traverse the channel in an interlaced fashion, they are processed in an interlaced fashion. Thus, to complete processing of mainframe data packets, at least some IFrame data packets are also processed, and thus the mainframe does not render as quickly as it could if processed without the IFrame data packets. The mainframe is typically more important than the IFrame (e.g., advertisements), so there is a desire to decrease the time of mainframe data packet processing even if at the expense of IFrame processing. One solution is to hold the IFrame data packets in a memory and to process all of the mainframe data packets before the first IFrame data packets is processed. Thus, given a bandwidth limited and single channel situation, the mainframe data packets can be downloaded before any of the IFrame data packets.

Memory Resources

Additionally, traditional methods for downloading data packets give mainframe and IFrame data packets equal priority in memory allocation. In this disclosure, the memory controller 126 directs data packets corresponding to the mainframe to be stored in the memory 112 with a greater priority than data packets corresponding to the IFrame. By greater priority it is meant that the data packets corresponding to the mainframe are generally written to faster memory types (or memory levels) than the data packets corresponding to the IFrame. For instance, if there is memory remaining in the first cache 108 and the second cache 110 after the memory controller 126 has allocated space to mainframe data packets (Blocks 310 and 356), then the remaining cache can be allocated to IFrame data packets (Block 312 and 358). If the data packets corresponding to the mainframe can all be allocated to the first cache 108 (Blocks 310 and 356) without filling the first cache 108, then at least some of the data packets corresponding to the IFrame can also be allocated to remaining space on the first cache 108 (Block 312 and 358).

Figure 3:
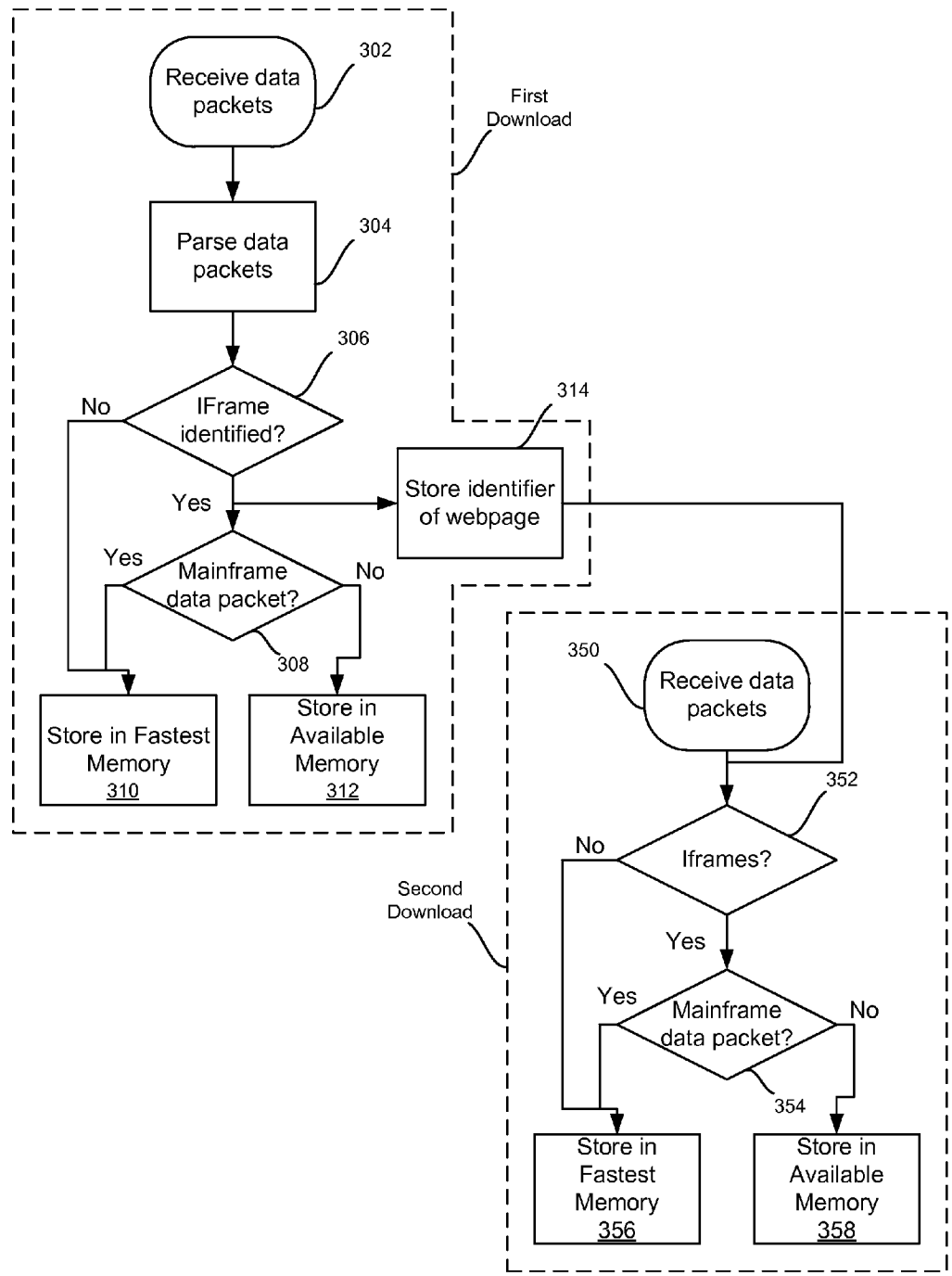
FIG. 3 illustrates a method of downloading and processing webpage data packets in response to a request for a webpage.

The method steps or operations illustrated in FIGS. 2 and 3 are not limited in order of operation to the order illustrated and these method steps can be interchanged without departing from the scope of the invention. In some instances, one or more of these operations can be carried out in parallel to or at the same time as another one or more of the operations.

Figure 6:
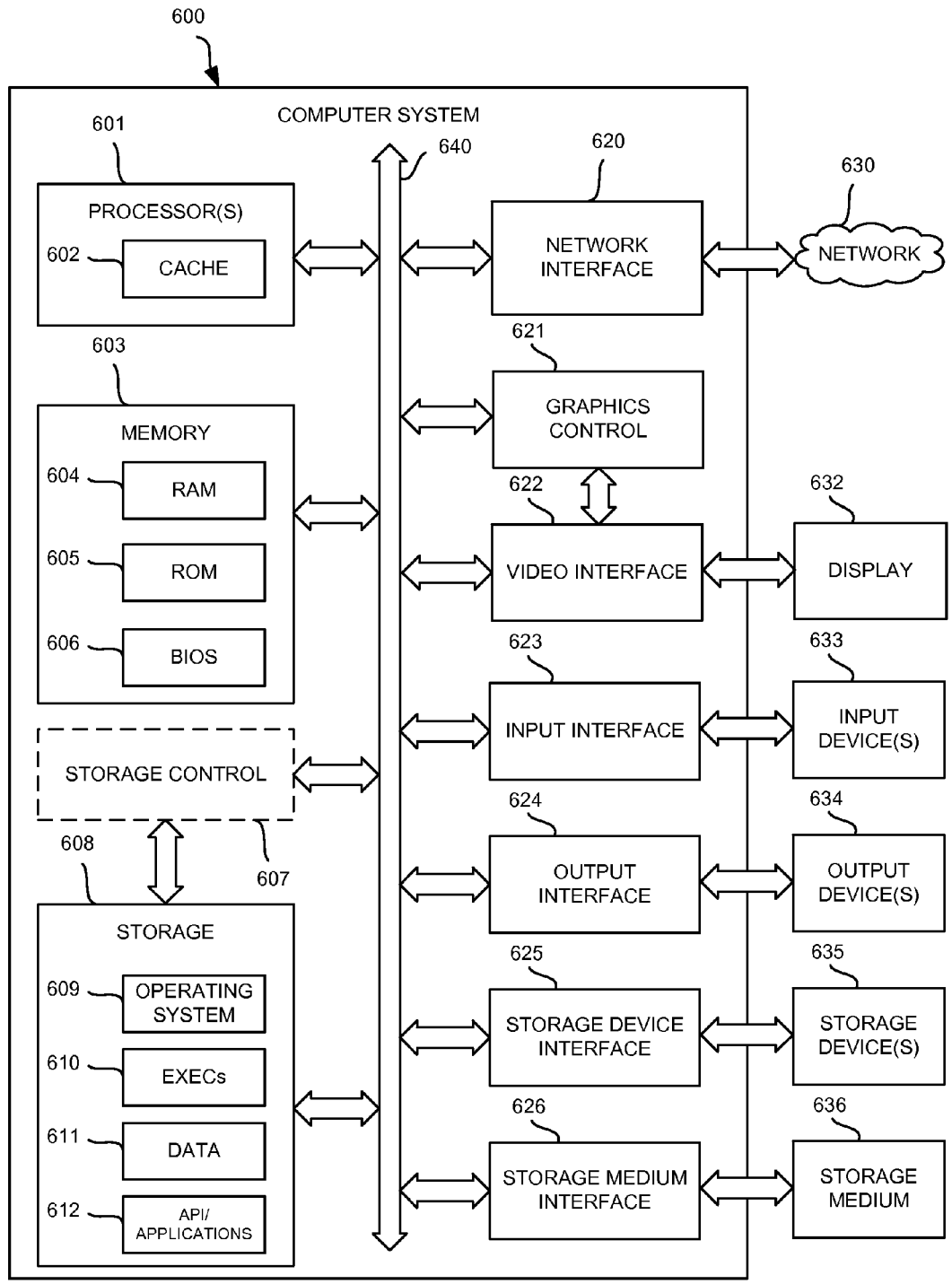
FIG. 6 shows a diagrammatic representation of one embodiment of a machine in the exemplary form of a computer system.

The systems and methods described herein can be implemented in a machine such as a computer system in addition to the specific physical devices described herein. FIG. 6 shows a diagrammatic representation of one embodiment of a machine in the exemplary form of a computer system 600 within which a set of instructions can execute for causing a device (e.g., user device 100) to perform or execute any one or more of the aspects and/or methodologies of the present disclosure. The components in FIG. 6 are examples only and do not limit the scope of use or functionality of any hardware, software, embedded logic component, or a combination of two or more such components implementing particular embodiments.

Computer system 600 may include a processor 601, a memory 603, and a storage 608 that communicate with each other, and with other components, via a bus 640. The bus 640 may also link a display 632, one or more input devices 633 (which may, for example, include a keypad, a keyboard, a mouse, a stylus, etc.), one or more output devices 634, one or more storage devices 635, and various tangible storage media 636. All of these elements may interface directly or via one or more interfaces or adaptors to the bus 640. For instance, the various tangible storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 601 (or central processing unit(s) (CPU(s))) optionally contains a cache memory unit 602 for temporary local storage of instructions, data, computer addresses, or mainframe and IFrame data packets. Processor(s) 601 are configured to assist in execution of computer readable instructions such as those found in mainframe and IFrame data packets. Computer system 600 may provide functionality as a result of the processor(s) 601 executing software embodied in one or more tangible computer-readable storage media, such as memory 603, storage 608, storage devices 635, and/or storage medium 636. The computer-readable media may store software that implements particular embodiments, and processor(s) 601 may execute the software. For instance, the computer-readable media may store a browser engine (e.g., browser engine 124) that the processor(s) 601 executes. Memory 603 may read the software from one or more other computer-readable media (such as mass storage device(s) 635, 636) or from one or more other sources through a suitable interface, such as network interface 620. The software may cause processor(s) 601 to carry out one or more processes or one or more steps of one or more processes described or illustrated herein. As one example, the software may cause processor(s) 601 to execute an HTML file and pass rendering dat to the video interface 622 for rendering to the display 632. Carrying out such processes or steps may include defining data structures stored in memory 603 and modifying the data structures as directed by the software.

The memory 603 may include various components (e.g., machine readable media) including, but not limited to, a random access memory component (e.g., RAM 604) (e.g., a static RAM "SRAM", a dynamic RAM "DRAM, etc.), a read-only component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable tangible computer-readable media described below. In one example, a basic input/output system 606 (BIOS), including basic routines that help to transfer information between elements within computer system 600, such as during start-up, may be stored in the memory 603.

Fixed storage 608 is connected bidirectionally to processor(s) 601, optionally through storage control unit 607. Fixed storage 608 provides additional data storage capacity and may also include any suitable tangible computer-readable media described herein. Storage 608 may be used to store operating system 609, EXECs 610 (executables), data 611, API applications 612 (application programs), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 may, in appropriate cases, be incorporated as virtual memory in memory 603. In some embodiments, a portion or all of the storage 608 can be located in "the cloud." In other words, the storage 608 may partially reside on remote servers accessible via the network interface 620 and the network 630.

In one example, storage device(s) 635 may be removably interfaced with computer system 600 (e.g., via an external port connector (not shown)) via a storage device interface 625. Particularly, storage device(s) 635 and an associated machine-readable medium may provide nonvolatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, specifically mobile devices and enterprise systems, connected to network 630. For instance, the computer system 600 may receive data packets from web servers via the network 630 in response to requests for webpages. Communications to and from computer system 600 may be sent through network interface 620. For example, network interface 620 may receive incoming communications (such as requests or responses from other devices) in the form of one or more data packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621.

In addition to a display 632, computer system 600 may include one or more other peripheral output devices 634 including, but not limited to, an audio speaker, a printer, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

For purposes of this disclosure a communication channel is established between any two devices, and in particular between network interfaces of the two devices. The communication channel can be made via a wired connection, a wireless connection, or a combination of the two. The communication channel may be encrypted or non-encrypted. The communication channel is not limited to any particular protocol, so for instance, UMTS, CDMA, and WiFi are each equally applicable protocols for implementing the communication channel. As another example the communication channel can use either TCP or UDP protocols.

For purposes of this disclosure a data packet (or packet) is a formatted unit of data carried by a packet mode computer network. However in some embodiments, the herein disclosed communication methods can utilize non-packet-based transmissions for instance where series of bytes, characters, or bits alone are transmitted.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of loading a webpage, the webpage having a mainframe and at least one IFrame within the mainframe, the method comprising:
   receiving data packets, via one or more network communication channels, in response to a request to load a webpage having the mainframe;
   determining that the webpage includes the at least one IFrame within the mainframe;
   identifying those of the data packets that are mainframe data packets;
   identifying those of the data packets that are data packets corresponding to the at least one IFrame within the mainframe;
   processing the mainframe data packets on a first core of an application processor;
   processing data packets corresponding to the at least one IFrame within the mainframe on a second core of the application processor;
   rendering the mainframe from the mainframe data packets; and
   rendering the at least one IFrame within the mainframe from the data packets corresponding to the at least one IFrame within the mainframe;
   wherein the mainframe data packets are received via a first of the one or more network communication channels, and
   wherein the data packets corresponding to the at least one IFrame within the mainframe are received via a second of the one or more network communication channels.

2. The method of claim 1, wherein the receiving includes receiving a first mainframe data packet and a first IFrame data packet on a one of the one or more network communication channels without a pause in network activity between receiving of these first two data packets, wherein the first and second processing overlap at least in part, and wherein the method further includes receiving a second mainframe data packet and receiving a second IFrame data packet on the one of the one or more network communication channels without a pause in network activity between receiving of the these second two data packets, wherein a pause in network activity occurs between the receiving the first IFrame data packet and the receiving the second mainframe data packet, and wherein the receiving the second mainframe data packet overlaps the processing of the first mainframe data packet.

3. The method of claim 1, further comprising storing the data packets in a memory, wherein the mainframe data packets are given priority when being stored in memory as compared to the data packets corresponding to the at least one IFrame within the mainframe.

4. The method of claim 3, wherein priority dictates a preference for memory slots in cache, then RAM, and then virtual memory.

5. The method of claim 3, wherein the mainframe data packets are stored in fastest available memory slots while the data packets corresponding to the at least IFrame within the mainframe are stored in other memory slots.

6. The method of claim 5, further comprising storing an identifier of the webpage in memory indicating that the webpage includes the at least one IFrame within the webpage.

7. The method of claim 6, wherein the identifier was stored in the memory as the result of a determining that the webpage includes the at least one IFrame within the mainframe on a previous download of the webpage.

8. The method of claim 1, wherein the determining includes parsing HTML code in the data packets to form parsed HTML.

9. The method of claim 5, wherein the determining further includes identifying an IFrame indicator in the parsed HTML.

10. The method of claim 1, wherein the determining includes scanning a memory for an identifier indicating that the webpage includes the at least one IFrame within the mainframe.

11. The method of claim 1 further comprising storing all data packets associated with the IFrame in memory until all data packets for the mainframe are processed, regardless as to an order in which the data packets for the IFrame and mainframe were received via the one or more network communication channels.

12. The method of claim 1 further comprising:
   receiving a first data packet corresponding to an IFrame via a first of the one or more network channels; then
   receiving a first mainframe data packet via a second of the one or more network channels while processing the first data packet corresponding to the IFrame on the second core of the application processor; then
   receiving a second data packet corresponding to the IFrame via the first of the one or more network channels while processing the first mainframe data packet on the first core of the application processor.

13. A system comprising;
   a network interface comprising at least a first and second network communication channel, the network interface comprising circuitry that in response to a request for a webpage:
      receives a mainframe data packet via the first network communication channel; and at the same time,
      receives a data packet corresponding to a self-contained component of the webpage within the mainframe via the second network communication channel, wherein the self-contained component is an IFrame;
   an application processor having:
      a first core that processes the mainframe data packet; and
      a second core that, at the same time, processes the data packet corresponding to the self-contained component of the webpage;
   a memory having at least first and second levels of memory; and
   a memory controller that oversees storage of the mainframe data packets and data packets corresponding to one or more self-contained components, including the self-contained component, of the webpage in either or both of the first and second levels of the memory.

14. The system of claim 13, further comprising an IFrame identification module that identifies the IFrame data packets.

15. The system of claim 14, wherein the IFrame identification module includes a browser parser module that parses incoming data packets so that the IFrame identification module can identify the IFrame data packets.

16. The system of claim 13, wherein the mainframe data packets are allocated to the first level of memory and the data packets corresponding to the one or more self-contained components of the webpage are allocated to any remaining portion of the first level of memory and then to the second level of memory.

17. The system of claim 16, wherein the first level of memory is a cache and the second level of memory is RAM.

18. The system of claim 16, wherein the first level of memory is a first cache and the second level of memory is a second level of cache.

19. The system of claim 16, wherein the first level of memory is RAM and the second level of memory is virtual memory.

20. The system of claim 13, wherein the mainframe data packets and the data packets corresponding to one or more self-contained components of the webpage reach the network interface and are processed by the application processor at the same time.

21. The system of claim 13, further comprising a network interface receiving, via one communication channel, the mainframe data packets for the webpage interlaced with the data packets corresponding to one or more self-contained components of the webpage.

22. The system of claim 21, wherein the mainframe data packets are processed by the first core at the same time that the data packets corresponding to the one or more self-contained components of the webpage traverse the one communication channel.

23. A non-transitory, tangible computer readable storage medium, encoded with processor readable instructions to perform a method for downloading a webpage, the method comprising:

receiving data packets, via one or more network communication channels, in response to a request to load a webpage having the mainframe;

determining that the webpage includes the at least one IFrame within the mainframe;

identifying those of the data packets that are mainframe data packets;

identifying those of the data packets that are data packets corresponding to the at least one IFrame within the mainframe;

processing the mainframe data packets on a first core of an application processor;

processing data packets corresponding to the at least one IFrame within the mainframe on a second core of the application processor;

rendering the mainframe from the mainframe data packets; and rendering the at least one IFrame within the mainframe from the data packets corresponding to the at least one IFrame within the mainframe;

wherein the mainframe data packets are received via a first of the one or more network communication channels, and wherein the data packets corresponding to the at least one IFrame within the mainframe are received via a second of the one or more network communication channels.

* * * * *